United States Patent
Ishihara et al.

(10) Patent No.: US 8,656,787 B2
(45) Date of Patent: Feb. 25, 2014

(54) ELECTROSTATIC CAPACITIVE PRESSURE SENSOR

(75) Inventors: Takuya Ishihara, Tokyo (JP); Nobuo Sashinami, Tokyo (JP)

(73) Assignee: Azbil Corporation, Tokyo (JP)

( * ) Notice: Subject to any disclaimer, the term of this patent is extended or adjusted under 35 U.S.C. 154(b) by 314 days.

(21) Appl. No.: 13/260,169

(22) PCT Filed: Mar. 26, 2010

(86) PCT No.: PCT/JP2010/055385
§ 371 (c)(1),
(2), (4) Date: Sep. 30, 2011

(87) PCT Pub. No.: WO2010/113803
PCT Pub. Date: Oct. 7, 2010

(65) Prior Publication Data
US 2012/0017691 A1    Jan. 26, 2012

(30) Foreign Application Priority Data

Mar. 30, 2009  (JP) .................................. 2009-083381
Mar. 30, 2009  (JP) .................................. 2009-083521

(51) Int. Cl.
G01L 9/12    (2006.01)
H01G 7/00    (2006.01)

(52) U.S. Cl.
USPC .............................. 73/724; 73/714; 361/283.4

(58) Field of Classification Search
None
See application file for complete search history.

(56) References Cited

U.S. PATENT DOCUMENTS

| | | | |
|---|---|---|---|
| 4,903,532 A * | 2/1990 | Tamai et al. | 73/718 |
| 4,996,627 A * | 2/1991 | Zias et al. | 361/283.4 |
| 5,042,308 A * | 8/1991 | Nakamura et al. | 73/718 |
| 5,134,887 A | 8/1992 | Bell | |
| 5,343,756 A * | 9/1994 | Nakamura et al. | 73/718 |
| 5,902,933 A * | 5/1999 | Bingo et al. | 73/724 |
| 6,109,113 A * | 8/2000 | Chavan et al. | 73/718 |
| 6,441,449 B1 * | 8/2002 | Xu et al. | 257/414 |
| 7,802,482 B2 * | 9/2010 | Ikeda | 73/718 |

FOREIGN PATENT DOCUMENTS

| | | |
|---|---|---|
| JP | 10-153510 A | 6/1998 |
| JP | 2002-107254 A | 4/2002 |
| JP | 2002-111011 A | 4/2002 |
| JP | 2004-323994 A | 11/2004 |
| JP | 2005-337924 A | 12/2005 |
| JP | 2008-107214 A | 5/2008 |

OTHER PUBLICATIONS

Japanese Office Action, dated Jan. 29, 2013, which issued during the prosecution of Japanese Patent Application No. 2009-083521, which corresponds to the present application.

* cited by examiner

*Primary Examiner* — Lisa Caputo
*Assistant Examiner* — Jermaine Jenkins
(74) *Attorney, Agent, or Firm* — Troutman Sanders LLP

(57) ABSTRACT

In an electrostatic capacitance pressure sensor provided with a pressure sensor chip of a diaphragm structure for detecting an electrostatic capacitance in accordance with a pressure of a medium to be measured, one face of a sensor diaphragm of the pressure sensor is a pressure introduction chamber side wherein the medium to be measured is introduced, and the other face is a capacitor chamber side wherein a capacitor portion is formed, where, in the sensor diaphragm, the rigidity is lower towards a center portion from a peripheral edge portion that is a boundary of diaphragm securing portions on the capacitor chamber side.

11 Claims, 5 Drawing Sheets

ELECTROSTATIC CAPACITIVE PRESSURE SENSOR

CROSS REFERENCE TO PRIOR APPLICATIONS

This application is a U.S. National Phase application under 35 U.S.C. §371 of International Application No. PCT/JP2010/055385, filed on Mar. 26, 2010 and claims benefit of priority to Japanese Patent Application No. 2009-083521, filed on Mar. 30, 2009 and Japanese Patent Application No. 2009-083381, filed on Mar. 30, 2009. The International Application was published in Japanese on Oct. 7, 2010 as WO 2010/113803 under PCT Article 21(2). All of these applications are herein incorporated by reference.

FIELD OF TECHNOLOGY

The present invention relates to an electrostatic capacitive pressure sensor provided with a pressure sensor chip having a diaphragm structure for detecting an electrostatic capacitance in accordance with the pressure of a medium being measured.

BACKGROUND

Conventionally, pressure sensors of a diaphragm type for detecting a change in a pressure to be measured as a change in electrostatic capacitance have been broadly known. As one example of such a pressure sensor there is a known diaphragm-type sensor wherein a filter is placed on a connecting hole between a vacuum chamber and a diaphragm vacuum gauge, to prevent non-reacted substances, byproduct substances, particulates, and the like, from getting into a vacuum gauge from a vacuum chamber, to prevent these deposition components from adhering to and being deposited onto the pressure-sensitive diaphragm that structures the diaphragm sensor. (See, for example, Japanese Unexamined Patent Application Publication H10-153510 (Pages 2 through 3 and FIG. 1)).

While the diaphragm sensor of the structure described above can prevent the adhesion, to the pressure-sensitive diaphragm, of highly linear deposition components such as the non-reacted substances, byproduct substances, particulates, and the like, that are included in the medium to be measured, because it is necessary to direct the pressure to be measured to the pressure-sensitive diaphragm, it is impossible to completely exclude the deposition components through filtering.

When a portion of these deposition components in the medium to be measured is deposited onto the surface that contacts the pressure-sensitive diaphragm, the pressure sensor diaphragm flexes in one direction, producing zero-point shift (a movement of the zero point). That is, the deposits adhering to the pressure sensitive diaphragm produce internal stresses, such as compressive stresses or tensile stresses, after adhesion, depending on the component, disrupting the balance of forces in the direction of thickness of the pressure-sensitive diaphragm by pulling on or compressing also the side of the pressure-sensitive diaphragm that comes into contact with the medium to be measured. This causes the pressure-sensitive diaphragm flex to be convex on the side of the median to be measured, or on the side opposite therefrom.

It is impossible to cause the deposits, which will vary depending on the medium to be measured, and the materials of the pressure-sensitive diaphragms to always match each other, and, microscopically, the arrangements of the atoms in the deposited substances and in the pressure-sensitive diaphragms rarely match perfectly, and thus the deposited substances normally produce the compression or elongation described above. Given this, the flexure of the pressure-sensitive diaphragm becomes larger the greater the amount of the deposited substance that is deposited on the pressure-sensitive diaphragm.

In this electrostatic capacitive pressure sensor, a pressure difference is detected based on the electrostatic capacitance that changes depending on the flexure of the pressure-sensitive diaphragm, and thus the phenomenon described above gives rise to a zero point error, known as "zero point shift," by detecting a signal indicating a pressure difference even in a state wherein there is no pressure difference across the pressure-sensitive diaphragm. Because of this, a problem is produced in that measurement errors will occur. Concomitant with this, a problem occurs in that this increases the frequency with which the pressure-sensitive diaphragm, that is, the diaphragm-type sensor, is changed, reducing the durability and increasing the cost thereof.

The object of the present invention is to provide an electrostatic capacitance pressure sensor wherein the zero point shift is reduced extremely through preventing the flexure of the pressure-sensitive diaphragm even when the medium being measured adheres to and is deposited on the pressure-sensitive diaphragm.

SUMMARY

In order to solve the problems set forth above, the electrostatic capacitive pressure sensor according to the present example is an electrostatic capacitive pressure sensor having a pressure sensor chip for detecting an electrostatic capacitance in accordance with the pressure of a medium being measured, wherein: one face of a sensor diaphragm of the pressure sensor is a pressure introduction chamber side for introducing the medium to be measured, and the other face is a capacitor chamber side for forming a capacitor portion; and in the sensor diaphragm, the rigidity is lower towards the central portion from a peripheral edge portion that is a boundary with a diaphragm securing portion on the capacitor chamber side.

Having the rigidity of the sensor diaphragm in the center portion be lower than that of the peripheral edge portion that is the boundary with the diaphragm securing portion of the capacitor chamber side makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured, thus making it possible to suppress the zero point shift of the pressure sensor.

The present example may also be provided with the following forms, as desired:

In the electrostatic capacitive pressure sensor as set forth, above, in the sensor diaphragm, the thickness is thinner towards the center portion from a peripheral edge portion that is a boundary with a diaphragm securing portion on the capacitor chamber side.

This form makes it possible to reduce the rigidity of the center portion by having the thickness of the center portion be thinner than the thickness of the peripheral edge, more so than the peripheral edge portion that is the boundary with the diaphragm securing portion of the capacitor chamber side. This makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured.

In the electrostatic capacitive pressure sensor as set forth above, in the sensor diaphragm, the thickness is thinner continuously towards the center portion from a peripheral edge portion that is a boundary with a diaphragm securing portion on the capacitor chamber side.

This form makes it possible to reduce the rigidity continuously towards the center portion from the peripheral edge portion, by thinning the thickness continuously towards the center portion of the sensor diaphragm from the peripheral edge portion that is the boundary with the diaphragm securing portion of the capacitor chamber side (formed so as to thin in a tapered shape). This makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured.

In the electrostatic capacitive pressure sensor as set forth above, in the sensor diaphragm, the thickness is thinner stepwise towards the center portion from a peripheral edge portion that is a boundary with a diaphragm securing portion on the capacitor chamber side.

This form above, makes it possible to reduce the rigidity sequentially towards the center portion from the peripheral edge portion, by thinning the thickness stepwise towards the center portion of the sensor diaphragm from the peripheral edge portion that is the boundary with the diaphragm securing portion of the capacitor chamber side (formed so as to thin in a stepped shape).

In any of the electrostatic capacitive pressure sensors as set forth above, the sensor diaphragm has a specific cavity in the pressure introduction chamber when viewed from the direction in which the medium to be measured is introduced.

In this form, when the deposition component in the medium to be measured adheres to and is deposited onto the sensor diaphragm, the deposited substance is divided into deposit pieces in accordance with the cavity, due to the formation of the specific cavity in the surface of the sensor diaphragm that makes contact with the medium to be measured. The result is that, although conventionally the internal stresses in the deposited substance produces a tensile stress or compressive stress that acts on the sensor diaphragm, depending on the component of the medium to be measured, with the present invention the tensile stress or compressive stress is reduced, suppressing the flexure in the direction of thickness of the sensor diaphragm that arises due to these internal stresses.

In the electrostatic capacitive pressure sensor as set forth, the sensor diaphragm has a cavity of a specific depth, continuous towards the direction of the center portion from a peripheral edge portion that is a boundary with a diaphragm securing portion on the capacitor chamber side, where the width of the cavity increases stepwise towards the center portion from the peripheral edge portion.

In the form above, the rigidity can be reduced continuously towards the center portion from the peripheral edge portion through having a cavity of a specific depth that is continuous towards the center portion from a peripheral edge portion in the face of the sensor diaphragm that contacts the medium to be measured, and increasing the width of the cavity stepwise towards the center portion from the peripheral edge portion. Moreover, when the deposition component in the medium to be measured adheres to and is deposited onto the sensor diaphragm, the deposited substance is divided into a stepwise deposit pieces. The result is that, although conventionally the internal stresses in the deposited substance produces a tensile stress or compressive stress that acts on the sensor diaphragm, depending on the component of the medium to be measured, with the present invention the tensile stress or compressive stress is reduced, suppressing the flexure in the direction of thickness of the sensor diaphragm that arises due to these internal stresses.

In the electrostatic capacitive pressure sensor as set forth above, the peripheral edge portion of the sensor diaphragm that is the boundary with the diaphragm securing portion on the capacitor chamber side and the center portion of the sensor diaphragm are made from different materials, and the material of the center portion is material with lower rigidity than the material of the peripheral edge portion.

In this form, having the center portion and the peripheral edge portion that is the boundary with the diaphragm securing portion of the capacitor chamber side be of different materials, and having the material of the center portion be a material with lower rigidity than the material of the peripheral edge portion, makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured, thus making it possible to suppress the zero point shift of the pressure sensor.

In the electrostatic capacitive pressure sensor as set forth above, the peripheral edge portion of the sensor diaphragm that is the boundary with the diaphragm securing portion of the capacitor chamber side is structured from a single material and the center portion of the sensor diaphragm has a two-layer structure made from different materials, where the pressure introduction chamber side of the sensor diaphragm is made from the same material as the peripheral edge portion, and the capacitor chamber side of the sensor diaphragm is made from a material of lower rigidity than the material of the peripheral edge portion.

In this form, having the peripheral edge portion that is the boundary with the diaphragm securing portion of the capacitor chamber side be structured from a single material and the center portion have a two-layer structure made from different materials, where the pressure introduction chamber side of the sensor diaphragm is made from the same material as the peripheral edge portion and the capacitor chamber side of the sensor diaphragm is made from a material of lower rigidity than the material of the peripheral edge portion makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured.

In the electrostatic capacitive pressure sensor as set forth above, the rigidity is determined by the Young's modulus and the Poisson's ratio of the material.

In this form, determining, through the Young's modulus and the Poisson's ratio, the rigidity of the sensor diaphragm with the two-layer structure wherein the materials are different in the peripheral edge portion and the center portion makes it possible to cause the rigidity of the center portion to be less than the rigidity of the peripheral edge portion. This makes it possible to suppress the flexure to one side of the sensor diaphragm that results from the internal stresses in the deposited substance, even when a component in the medium being measured adheres to and is deposited onto the surface of the sensor diaphragm that is in contact with the medium being measured.

In the electrostatic capacitive pressure sensor as set forth above, the material of the peripheral edge of the sensor diaphragm is sapphire, and the material of the center portion is quartz glass.

In the form above, having the material of the peripheral edge of the sensor diaphragm be sapphire, and the material of the center portion be quartz glass makes it possible to cause the rigidity of the center portion to be less than the rigidity of the peripheral edge portion.

In the electrostatic capacitive pressure sensor as set forth above, the sensor diaphragm has a specific cavity in the pressure introduction chamber when viewed from the direction in which the medium to be measured is introduced.

In this form, when the deposition component in the medium to be measured adheres to and is deposited onto the sensor diaphragm, the deposited substance is divided into deposit pieces in accordance with the cavity, due to the formation of the specific cavity in the surface of the sensor diaphragm that makes contact with the medium to be measured. The result is that, although conventionally the internal stresses in the deposited substance produces a tensile stress or compressive stress that acts on the sensor diaphragm, depending on the component of the medium to be measured, with the present example the tensile stress or compressive stress is reduced, suppressing the flexure in the direction of thickness of the sensor diaphragm that arises due to these internal stresses.

It possible to suppress the flexure to one side of the sensor diaphragm that results from the internal stresses in the deposited substance, even when a deposition component in the medium being measured adheres to and is deposited onto the surface of the sensor diaphragm that is in contact with the medium being measured, and thus possible to suppress zero point shift in the pressure sensor. Moreover, it is possible to simplify the structure of the sensor diaphragm.

DETAILED DESCRIPTION OF THE INVENTION

The structure as illustrated in the various figures are illustrative, and there is no limitation to the dimensions or ratios thereof, and they can be used after appropriate design changes depending on the use. Moreover, identical structures across the drawings are assigned identical codes, and explanations thereof are omitted as appropriate.

An electrostatic capacitive pressure sensor (hereinafter termed simply a "pressure sensor") according to an example of the present invention is explained below based on the figures. An example of the present invention is achieved through changing the shapes of a center portion and of a peripheral edge portion that is a boundary with a securing portion on the capacitor chamber side of the sensor diaphragm that structures the pressure sensor chip. As the basic structure, the rigidity of the center portion is caused to be less than the rigidity of the peripheral edge portion through having the thickness of the center portion be thinner than that of the peripheral edge portion.

Figure 1:
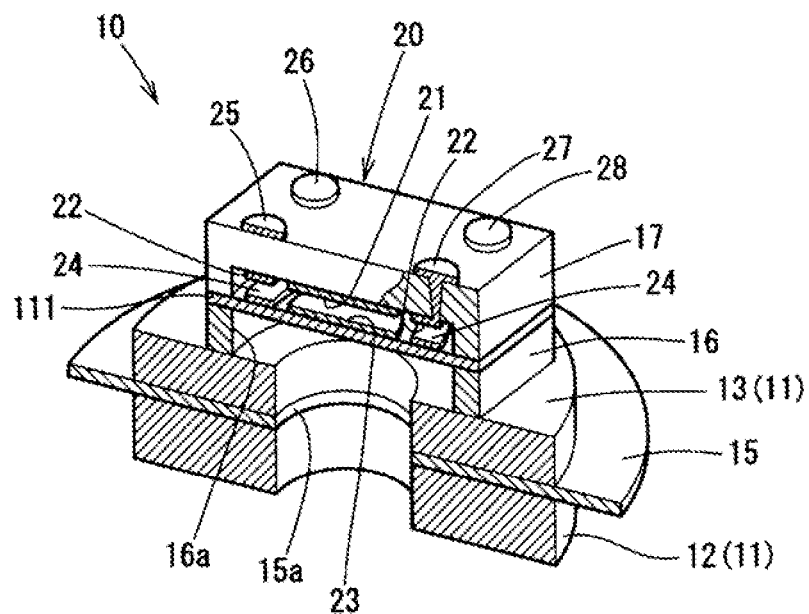
FIG. 1 is a partial cross-section perspective diagram illustrating partially the structure of a pressure sensor chip of an electrostatic capacitive pressure sensor according to an example of the present invention.

FIG. 1 is a cutaway sectional diagram of a pressure sensor chip of a pressure sensor that is the basis for the electrostatic capacitive pressure sensor according to the example, wherein a pressure sensor 10 is provided with: a pedestal plate 11 that is contained within a package, not shown; a pressure sensor chip 20 that is similarly contained within the package and that is bonded to the pedestal plate 11; and an electrode lead portion, not shown, that is attached directly to the package and that conductively connects between the inside and the outside of the package. Moreover, the pedestal plate 11 is separate from the package, supported on the package through a support diaphragm 15. The package is made from, for example, a nickel alloy that is a metal that is resistant to corrosion, and is bonded through respective welds.

The support diaphragm 15 is made from a thin plate of nickel alloy having an exterior shape matching the shape of the package, where a peripheral edge portion is bonded, through welding, held between a lower housing and an upper housing of the package.

Note that the thickness of the support diaphragm 15 is, in the case of the present example, several tens of micrometers, and is sufficiently thinner than a lower pedestal plate 12 and an upper pedestal plate 13 that form the pedestal plate 11. Additionally, a pressure introducing hole 15a, for introducing pressure into the pressure sensor chip 20, is formed in the center part of the support diaphragm 15.

A thin ring-shape lower pedestal plate 12 and upper pedestal plate 13, made out of sapphire, which is a single-crystal aluminum oxide crystal, are bonded to both sides of the support diaphragm 15 around the entirety in the peripheral direction, at positions somewhat separated from the bonding portion of the supporting diaphragm 15 and the package.

Note that the pedestal plates 12 and 13 are adequately thick, as described above, relative to the thickness of the supporting diaphragm 15, and are structured so as to hold the support diaphragm 15 in a so-called "sandwich shape" between the two pedestal plates 12 and 13. Doing so prevents warping of this part due to thermal stresses that are produced through a difference in the coefficients of thermal expansion of the pedestal plate 11 and the support diaphragm 15.

Additionally, after the pressure sensor chip 20, having a square shape when viewed from above, and having been made from sapphire, which is a single-crystal aluminum oxide crystal, is bonded to the upper pedestal plate 13, it is bonded through a spacer 16 or a bonding material that is an aluminum oxide base that will change into the same material as the upper pedestal plate 13. Note that this bonding method is set forth in detail in Japanese Unexamined Patent Application Publication 2002-111011, and thus detailed explanations will be omitted here.

The pressure sensor chip 20 has: a spacer 16, made out of a thin plate that appears to be a square in the plan view; a sensor diaphragm 111, as a pressure-sensitive diaphragm wherein a deformation occurs in accordance with the application of a pressure, bonded to the spacer 16; and a sensor pedestal 17 that forms a vacuum capacitor chamber (a reference chamber) 20A through bonding to the sensor diaphragm 111, which has the same shape as the spacer 16. This sensor pedestal 17 has, formed in the bottom face thereof, a recessed portion 17a, formed in a round hole shape, where this recessed portion 17a serves as the capacitor chamber 20A. Additionally, the capacitor chamber 20A for the vacuum and the reference capacity chamber within the package that contains the pressure sensor chip 20 maintain an identical vacuum level for both through a connecting hole, not shown, penetrating through an appropriate location of the sensor pedestal 17. Moreover, a hole 16a is formed in the spacer 16. The recessed portion 17a of the sensor pedestal 17 and the hole 16a of the spacer 16 preferably are of essentially the same radius.

The spacer 16, the sensor diaphragm 111, and the sensor pedestal 17 are bonded to each other through so-called direct bonding, to structure an integrated pressure sensor chip 20. Moreover, a pressure sensing side stationary electrode 21 and a reference side stationary electrode 22 are formed out of a conductor such as platinum, or the like, in the recessed portion 17a of the sensor pedestal 17, and a pressure sensing side movable electrode 23 and a reference side movable of electrode 24 are formed out of a conductor such as platinum, or the like, on the front face (top face) 111a of the sensor diaphragm 111, which faces the sensor pedestal 17, in the capacitor chamber 20A of the pressure sensor chip 20.

Note that the pressure sensing side stationary electrode 21 is formed as a circle, when viewed in the plan view, in the center portion of the recessed portion 17a, and the reference side stationary electrode 22 and the pressure sensing side stationary electrode 21 are separate from each other, and are formed in concentric shapes that appear as arcs, in the plan view, so as to essentially encompass the periphery thereof.

Additionally, the pressure sensing side movable electrode 23 and the reference side movable electrode 24 are formed on the front face (the top face) 111a on the capacitor chamber 20A side of the sensor diaphragm 111 in shapes that correspond respectively to the respective pressure sensing side stationary electrode 21 and the reference side stationary electrode 22 so as to face each other. Moreover, the pressure sensing side stationary electrode 21 and the pressure sensing side movable electrode 23 are of high sensitivity relative to the pressure, and fulfill the role of performing the pressure measurement while, on the other hand, the reference side stationary electrode 22 and the reference side movable electrode 24 are of low sensitivity relative to the pressure, and fulfill the role of correcting the permittivity between the electrodes.

Additionally, pads, for electrode lead-out are deposited through vapor deposition on the four corners on the top face of the pressure sensor chip 20. These electrode lead-out pads are a pressure sensing side stationary electrode lead-out pad 25, a pressure sensing side movable electrode lead-out pad 26, a reference side stationary electrode lead-out pad 27, and a reference side movable electrode lead-out pad 28. Moreover, the pressure sensing side stationary electrode 21 and the pressure sensing side stationary electrode lead-out pad 25 are connected electrically through a conductor that is deposited as thin-film in the electrode lead-out hole.

Similarly, the reference side stationary electrode 22 and the reference side stationary electrode lead-out pad 27, the pressure sensing side movable electrode 23 and the pressure sensing side movable electrode lead-out pad 26, and the reference side movable electrode 24 and the reference side movable electrode lead-out pad 28 are connected respectively to each other electrically through conductors that are deposited as thin-films in the respective electrode lead-out holes.

Four electrode lead portions are provided corresponding to the individual electrode lead-out pads, and are provided with electrode lead pins and metal shields, where the electrode lead pins are embedded in the center part through hermetic sealing from an insulating material such as glass on the metal shield, to maintain an airtight state between the two end portions of each electrode lead pin.

Additionally, one end of each electrode lead pin is exposed to the outside of the package, and the output of the pressure sensor 10 propagates to an external signal processing portion through an interconnection, not shown. Note that a hermetic seal is interposed also between the shield and the cover of the package.

The structure of the sensor diaphragm 111 relating to the present example is explained next in reference to FIG. 2. The sensor diaphragm 111 is a plate body having the same external shape as the external shape of the spacer 16, and a circular recessed portion 111c is formed in the face that is on the bottom side in FIG. 2, that is, the face (bottom face) 111b of the pressure introducing chamber side, which contacts the medium to be measured (that is, the face that contacts the medium to be measured). The size of the opening portion of the recessed portion 111c is about half the diameter of the region of the sensor diaphragm 111 that contacts the medium to be measured, and the depth of the opening portion of the recessed portion 111c is about 1/10 the plate thickness. Note that the combination of the size and depth of the opening portion of the recessed portion 111c is not limited to that of the present example, but rather an optimal depth may be designed in relation to the size of the opening portion (the dimension of the opening region) of the recessed portion 111c.

Figure 3:
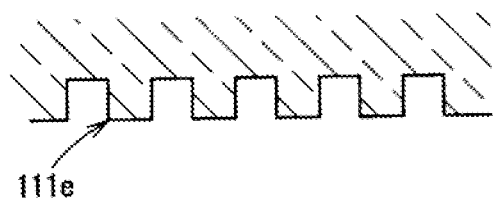
FIG. 3 is a partial magnified diagram of the bottom face of the recessed portion in the pressure sensor chip according to the example.

Additionally, as illustrated in the partial enlargement FIG. 3, on the bottom face 111d of the recessed portion 111c a fine corrugation 111e is formed across the entire surface, to the center portion from the peripheral edge portion that is the boundary of the recessed portion 17a of the sensor pedestal 17 and the inner peripheral surface of the hole 16a of the spacer 16. The corrugation 111e is formed through a well-known micro-machining technology. The sensor diaphragm 111 is formed from sapphire, as described above, but there is no limitation thereto, and another material, such as a nickel alloy that is resistant to corrosion, may be used.

The sensor diaphragm 111 is held sandwiched between the sensor pedestal 17 of the capacitor chamber side and the spacer 16 of the pressure introduction chamber side, where the peripheral edge portion is bonded securely to the end faces 17b and 16b of the sensor pedestal 17 and the spacer 16.

Following this, in the sensor diaphragm 111, the thickness of the center portion 111g is thinner than the thickness of the region up to the recessed portion 111c from the peripheral edge portion 111f that is the boundary of the recessed portion 17a of the sensor pedestal 17 and the hole 16a of the spacer 16, as the securing portion of the sensor diaphragm 111. That is, in the sensor diaphragm 111, the rigidity of the center portion 111g is less than the rigidity of the peripheral edge portion 111f.

Figure 4:
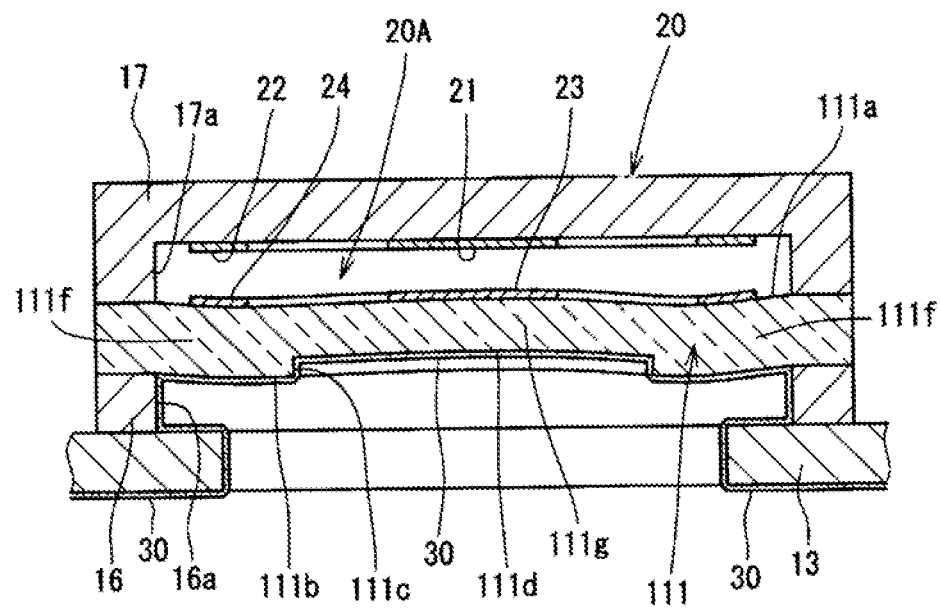
FIG. 4 is an explanatory diagram illustrating one example of a state wherein there is flexure due to a deposition component of the medium being measured being adhered to the sensor diaphragm.

FIG. 4 illustrates the state wherein a deposition component 30 in the medium to be measured is adhered to and deposited on the face (the bottom face) 111b of the sensor diaphragm 111 that contacts the medium to be measured, so that the region of the peripheral edge portion 111f of the sensor diaphragm 111 (the region that is to the outside of the recessed portion 111c) is flexed slightly towards the pressure introduction chamber side (the face that makes contact with the medium to be measured) (downward in the diagram) (tension), and the region of the center portion 111g (the region of the recessed portion 111c) is flexed slightly towards the capacitor chamber side (the capacitor chamber 20A) (upward in the diagram) (compression).

Figure 5:
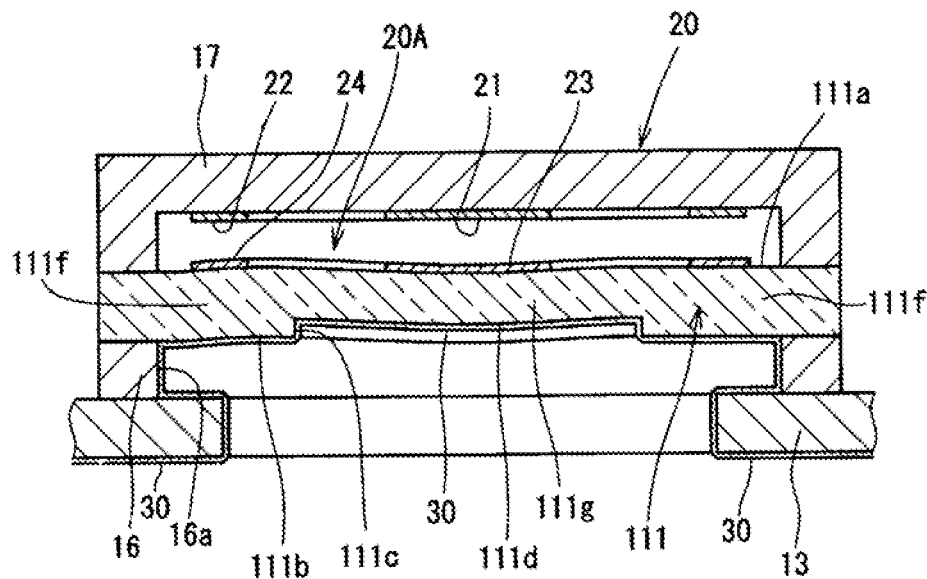
FIG. 5 is an explanatory diagram illustrating another example of a state wherein there is flexure due to a deposition component of the medium being measured being adhered to the sensor diaphragm.

Additionally, FIG. 5 illustrates the state wherein a deposition component 30 in the medium to be measured is adhered to and deposited on the face (the bottom face) 111b of the sensor diaphragm 111 that contacts the medium to be measured, so that the region of the peripheral edge portion 111f of the sensor diaphragm 111 (the region that is to the outside of the recessed portion 111c) is flexed slightly towards the capacitor chamber side (the capacitor chamber 20A) (upward in the diagram) (compression), and the region of the center portion 111g (the region of the recessed portion 111c) is flexed slightly towards the pressure introduction chamber side (the face that makes contact with the medium to be measured) (downward in the diagram) (tension).

As described above, it is impossible to cause the deposits, which will vary depending on the medium to be measured, and the materials of the sensor diaphragm 111 to always match each other, and, microscopically, the arrangements of the atoms in the deposited substances and in the sensor diaphragms rarely match perfectly, and thus the deposited substances normally produce the compression or elongation described above. Given this, the flexure of the pressure-sensitive diaphragm becomes larger the greater the amount of the deposited substance that is deposited on the pressure-sensitive diaphragm. Consequently, the flexure of the sensor diaphragm 111 will flex as illustrated in FIG. 4 and FIG. 5, in accordance with the type of material of the sensor diaphragm 111 and with the type of the medium to be measured.

It is possible to suppress the zero point shift of the pressure sensor 10, because it is possible to reduce the change in the spacing between the opposing pressure sensing side stationary electrode 21 and pressure sensing side movable electrode 23 and the reference side stationary electrode 22 and the reference side movable electrode 24, through suppressing the flexure in the one direction of the sensor diaphragm 111 that is caused by the compression or tension of the deposition component 30 in the medium to be measured, even when the deposition component 30 in the medium to be measured adheres to and is deposited on the face 111b of the sensor diaphragm 111 that comes in contact with the medium to be measured.

Additionally, it is possible to suppress the flexure of the sensor diaphragm in the thickness direction arising from the internal stresses through essentially reducing the tensile threes or compressive forces, depending on the component, with which the internal stresses of the deposited substance act on the sensor diaphragm 111, because it is possible to separate the deposited substance into deposit pieces, in accordance with the cavity, when the deposition component 30 within the medium to be measured adheres to and is deposited on the sensor diaphragm, through the formation of the fine corrugation 111e on the bottom face 111d of the recessed portion 111c that is formed on the face (the bottom face) 111b that contacts the medium to be measured. Doing so makes it possible to suppress the zero point shift of the pressure sensor 10 more effectively.

Figure 2:
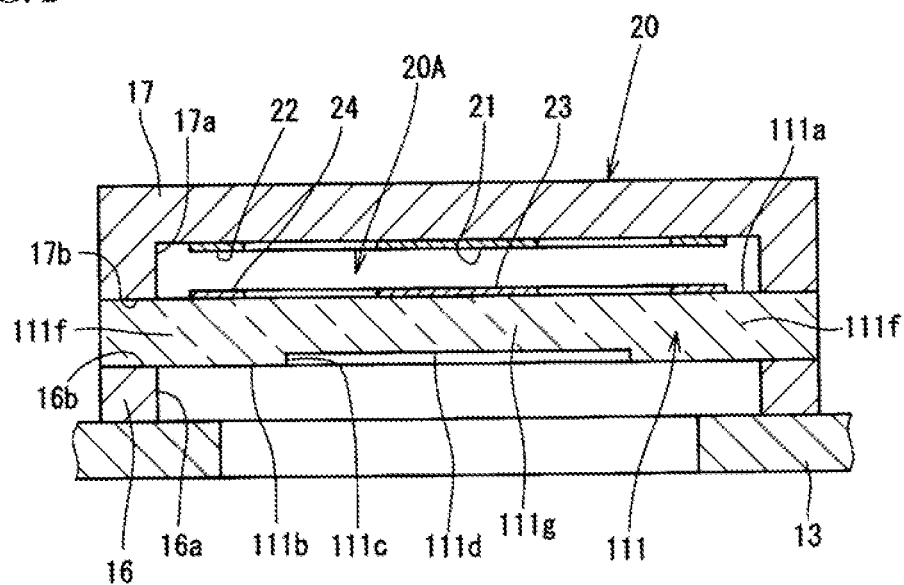
FIG. 2 is a partial cross-sectional diagram of the pressure sensor chip according to the example.
Figure 6:
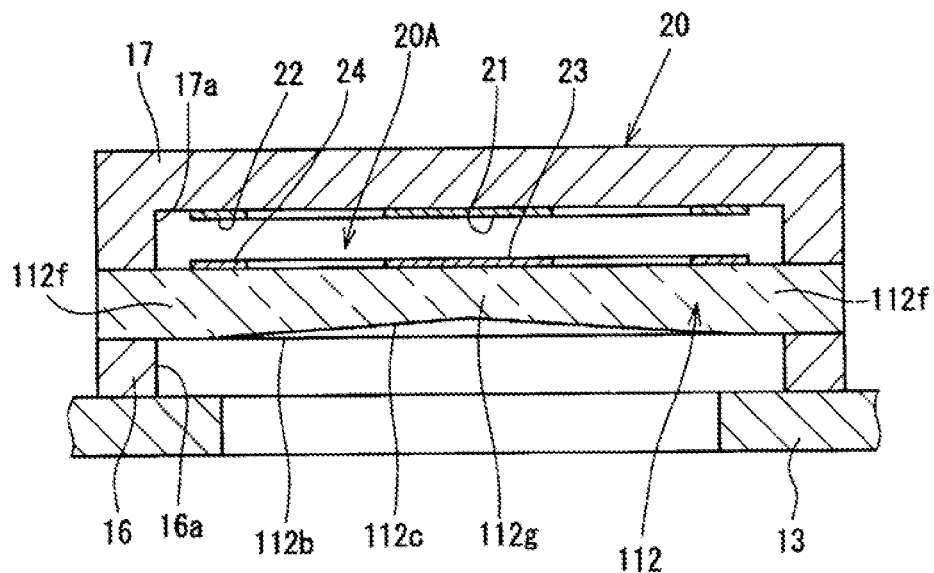
FIG. 6 is a cross-sectional diagram of a modified example of a sensor diaphragm.

FIG. 6 is a modified example of a sensor diaphragm 111 illustrated in FIG. 2. In the sensor diaphragm 112, a conical recessed portion 112c is formed in the surface on the bottom side, that is, in the face (bottom face) 112b on the pressure introduction chamber side that contacts the medium to be measured (that is, the side that contacts the medium to be measured). In this conical recessed portion 112c, the thickness becomes thinner continuously, forming a tapered shape, towards the center portion 112g from the peripheral edge portion 112f that is the boundary with the end faces 17b and 16b as the diaphragm securing portions of the sensor pedestal 17 and the spacer 16. Moreover, in the present example, the plate thickness of the center portion 112g is approximately half the plate thickness of the peripheral edge portion 112f. Note that the shape of the recessed portion 112c that is formed at the face (bottom face) 112b of the sensor diaphragm 112 is designed with an optimal tapered angle (depth) of the opening portion in accordance with the size of the opening portion (the dimension of the opening region) of the recessed portion 112c.

In this way, it is possible to reduce continuously the rigidity towards the center portion 112g from the peripheral edge portion 112f by forming the thickness to be continuously thinner (thinning in a tapered shape) towards the center of the sensor diaphragm 112 from the peripheral edge portion 112f that is the boundary with the diaphragm securing portion of the capacitor chamber side. Doing so makes it possible to suppress the flexure in the one direction of the sensor diaphragm 112 caused by the compression or tension of the deposition component (the deposited substance), even when the deposition component within the medium to be measured adheres to and is deposited onto the face (bottom face) 112b of the sensor diaphragm 112 that contacts the medium to be measured. Note that corrugation, as illustrated in FIG. 3, may also be formed on the front surface (the tapered surface) of the recessed portion 112c.

Figure 7:
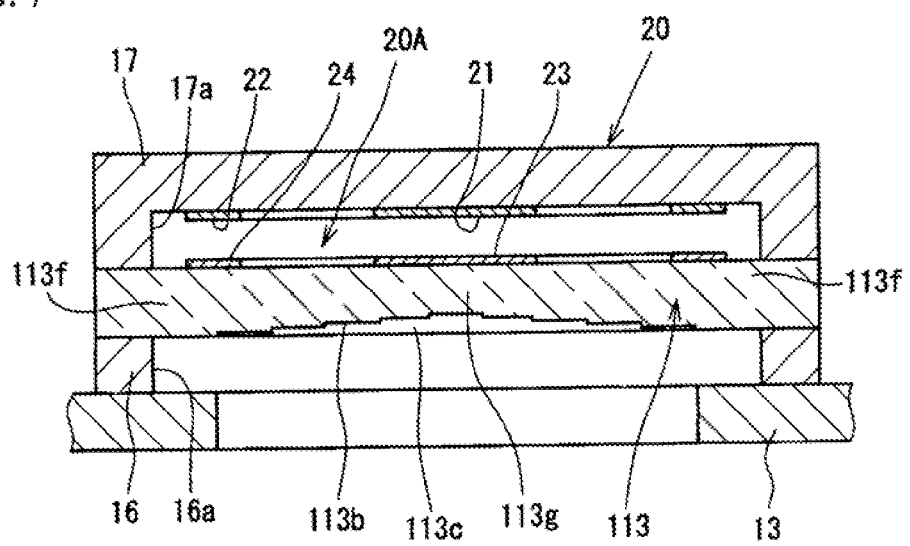
FIG. 7 is a cross-sectional diagram of another modified example of a sensor diaphragm.

FIG. 7 is another modified example of a sensor diaphragm 111 illustrated FIG. 2. In the sensor diaphragm 113, a recessed portion 113c of a stepped shape that has a sequence the smaller diameter, concentrically, in a stepped shape towards the center portion 113g from the peripheral edge portion 113f that is the boundary with the diaphragm securing portion of the capacitor chamber side is formed in the surface on the bottom side, that is, in the face (bottom face) 113b on the pressure introduction chamber side that contacts the medium to be measured (that is, the side that contacts the medium to be measured). Note that in FIG. 7, the solid lines for the horizontal direction indicating the step portions are omitted for simplicity and clarity in the illustration.

That is, in the other modified example illustrated in FIG. 7, the thickness of the sensor diaphragm 113 becomes sequentially thinner stepwise towards the center portion 113g from the peripheral edge portion 113f. Moreover, in the present example, the plate thickness of the center portion 113g is approximately half the plate thickness of the peripheral edge portion 113f. Note that the shape of the recessed portion 113c that is formed at the face (bottom face) 113b of the sensor diaphragm 113 is designed with an optimal step height (depth) of the opening portion in accordance with the size of the opening portion (the dimension of the opening region) of the recessed portion 113c.

In this way, it is possible to reduce the rigidity sequentially towards the center portion 113g from the peripheral edge portion 113f, by thinning the thickness stepwise (thinning in a stepped shape) towards the center portion 113g from the peripheral edge portion 113f that is the boundary with the diaphragm securing portion of the capacitor chamber side. Doing so makes it possible to suppress the flexure in the one direction of the sensor diaphragm 113 caused by the compression or tension of the deposition component (the deposited substance), even when the deposition component within the medium to be measured adheres to and is deposited onto the face (bottom face) 113b of the sensor diaphragm 113 that contacts the medium to be measured. Note that corrugation, as illustrated in FIG. 3, may also be formed on the front surface (the stepped surface) of the recessed portion 113c. Moreover, the width of the steps may also be increased sequentially toward the center from the peripheral edge.

Note that as the shape of the sensor diaphragm, the sensor diaphragm was formed with the recessed portion 111c wherein the bottom face was flat, illustrated in FIG. 2, the recessed portion 112c of the tapered shape shown in FIG. 6, and the recessed portion 113c with the stepped shape shown in FIG. 7. However, there is no limitation thereto, and the shape may be another shape, such as, for example, a shape wherein the thickness becomes thinner continuously to a specific thickness and then, thereafter, the thickness becomes constant (to form a tapered shape plus a flat shape), or the thickness may become thin stepwise to a specific thickness and then, thereafter, the thickness becomes constant (to form a stepped shape plus a flat shape), or the thickness may become thinner continuously to a specific thickness, and then, thereafter, the thickness may become thinner stepwise (to form a tapered shape plus a stepped shape), or, further, the thickness may become thinner stepwise up to a specific thickness, and then, thereafter, the thickness may become thinner continuously (to form a stepped shape plus a tapered shape).

Furthermore, the sensor diaphragm may have a cavity of a specific depth that is continuous to the center portion from the peripheral edge portion that is the boundary with the diaphragm securing portion of the capacitor chamber side, and the width of this cavity may increase stepwise towards the center portion from the peripheral edge portion.

Note that when it comes to the shape of the recessed portion that is formed on the face (the bottom face) of the sensor diaphragm, an optimal depth for the opening portion should be designed in accordance with the size of the opening portion (the dimension of the opening region) of the recessed portion.

As explained above, having the rigidity of the sensor diaphragm in the center portion be lower than that of the peripheral edge portion that is the boundary with the diaphragm securing portion of the capacitor chamber side makes it possible to suppress the flexure to one side of the sensor diaphragm that results from the compression or tension in the deposited substance, even when a component in the medium being measured adheres to and is deposited onto the surface of the sensor diaphragm that is in contact with the medium being measured, thus making it possible to suppress the zero point shift of the pressure sensor.

A pressure sensor according to another example is explained below next based on the figures. The present examples are achieved through reducing the rigidity towards center portion from the peripheral edge portion that is a boundary with a securing portion on the capacitor chamber side of the sensor diaphragm that structures the pressure sensor chip. As a basic structure, the materials of the center side and the peripheral edge are changed so that the material of the center side is a material with rigidity that is lower than that of the material of the peripheral edge. Moreover, this rigidity is specified by the Young's modulus and the Poisson's ratio of the material.

The structure of the pressure sensor according to this example is similar to the structure explained for the example above (shown in FIG. 1), and thus the explanation thereof will be omitted.

Figure 8:
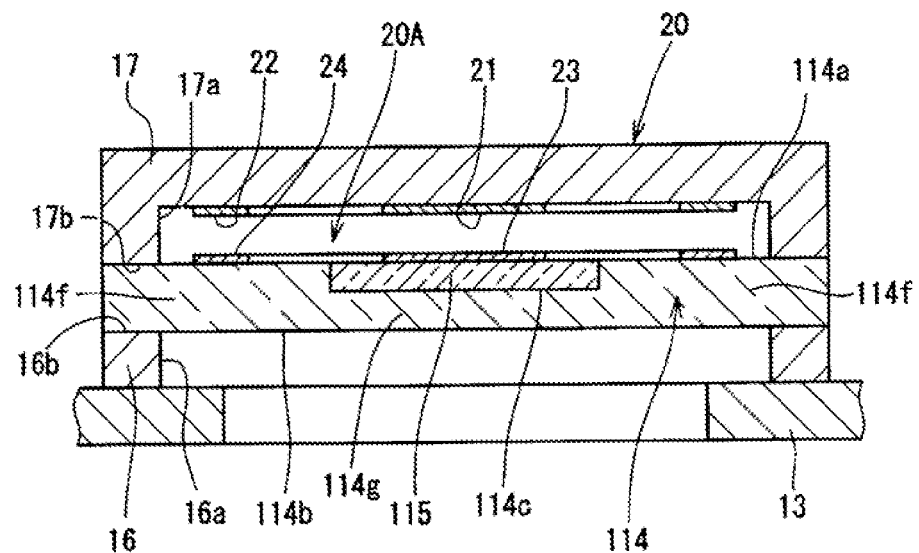
FIG. 8 is a partial cross-sectional diagram of the pressure sensor chip according to another example.

As illustrated in FIG. 8, the pressure sensor chip 20 according to this example has: a spacer 16, made out of a thin plate that appears to be a square in the plan view; a sensor diaphragm 114, as a pressure-sensitive diaphragm wherein a deformation occurs in accordance with the application of a pressure, bonded to the spacer 16; and a sensor pedestal 17 that forms a vacuum capacitor chamber (a reference chamber) 20A through bonding to the sensor diaphragm 114, which has the same shape as the spacer 16. This sensor pedestal 17 has, formed in the bottom face thereof, a recessed portion 17a, formed in a round hole shape, where this recessed portion 17a serves as the capacitor chamber 20A. Additionally, the capacitor chamber 20A for the vacuum and the reference capacity chamber within the package that contains the pressure sensor chip 20 maintain an identical vacuum level for both through a connecting hole, not shown, penetrating through an appropriate location of the sensor pedestal 17. Moreover, a hole 16a of essentially the same radius as the recessed portion 17a of the sensor pedestal 17 is formed in the spacer 16.

The spacer 16, the sensor diaphragm 114, and the sensor pedestal 17 are bonded to each other through so-called direct bonding, to structure an integrated pressure sensor chip 20. Moreover, a pressure sensing side stationary electrode 21 and a reference side stationary electrode 22 are formed out of a conductor such as platinum, or the like, in the recessed portion 17a of the sensor pedestal 17, and a pressure sensing side movable electrode 23 and a reference side movable of electrode 24 are formed out of a conductor such as platinum, or the like, on the front face (top face) 114a of the sensor diaphragm 114, which faces the sensor pedestal 17, in the capacitor chamber 20A of the pressure sensor chip 20.

Note that the pressure sensing side stationary electrode 21 is formed as a circle, when viewed in the plan view, in the center portion of the recessed portion 17a, and the reference side stationary electrode 22 and the pressure sensing side stationary electrode 21 are separate from each other, and are formed in concentric shapes that appear as arcs, in the plan view, so as to essentially encompass the periphery thereof.

Additionally, the pressure sensing side movable electrode 23 and the reference side movable electrode 24 are formed on the front face (the top face) 114a on the capacitor chamber 20A side of the sensor diaphragm 114 in shapes that correspond respectively to the respective pressure sensing side stationary electrode 21 and the reference side stationary electrode 22 so as to face each other. Note that the pressure sensing side movable electrode 23 is formed on the top face of the glass plate 115 that is provided in the front face (the top face) 114a of the capacitor chamber 20A side of the sensor diaphragm 114, described below. Moreover, the pressure sensing side stationary electrode 21 and the pressure sensing side movable electrode 23 are of high sensitivity relative to the pressure, and fulfill the role of performing the pressure measurement while, on the other hand, the reference side stationary electrode 22 and the reference side movable electrode 24 are of low sensitivity relative to the pressure, and fulfill the role of correcting the permittivity between the electrodes.

Additionally, electrode lead-out pads are deposited through vapor deposition on the four corners on the top face of the pressure sensor chip 20. These electrode lead-out pads are a pressure sensing side stationary electrode lead-out pad 25, a pressure sensing side movable electrode lead-out pad 26, a reference side stationary electrode lead-out pad 27, and a reference side movable electrode lead-out pad 28. Moreover, the pressure sensing side stationary electrode 21 and the pressure sensing side stationary electrode lead-out pad 25 are connected electrically through a conductor that is deposited as thin-film in the electrode lead-out hole.

Similarly, the reference side stationary electrode 22 and the reference side stationary electrode lead-out pad 27, the pressure sensing side movable electrode 23 and the pressure sensing side movable electrode lead-out pad 26, and the reference side movable electrode 24 and the reference side movable electrode lead-out pad 28 are connected respectively to each other electrically through conductors that are deposited as thin-films in the respective electrode lead-out holes.

Four electrode lead portions are provided corresponding to the individual electrode lead-out pads, and are provided with electrode lead pins and metal shields, where the electrode lead pins are embedded in the center part through hermetic sealing from an insulating material such as glass on the metal shield, to maintain an airtight state between the two end portions of each electrode lead pin.

Additionally, one end of each electrode lead pin is exposed to the outside of the package, and the output of the pressure sensor 10 propagates to an external signal processing portion through an interconnection, not shown. Note that a hermetic seal is interposed also between the shield and the cover of the package.

The structure of the sensor diaphragm 114 relating to the other example is explained next. The sensor diaphragm 114 is a plate body having the same external shape as the external shape of the spacer 16, and a circular recessed portion 114c is formed in the face that is on the top side in FIG. 8, that is, the front face (top face) 114a of the capacitor chamber side (the capacitor chamber 20A).

Then the disk-shaped glass plate 115 is fitted and secured into the recessed portion 114c so as to be coplanar with the top face 114a of the sensor diaphragm 114. In the glass plate 115, a glass of a material that is different from that of the sensor diaphragm 114 is used, where a glass of a material wherein the rigidity is a lower rigidity than the rigidity of the sensor diaphragm 114 is used. The sensor diaphragm 114 is formed from sapphire, as one example, as described above, and the glass plate 115 is formed from, for example, quartz glass.

In this way, it is possible to reduce the rigidity of the sensor diaphragm 114 towards the center portion 114g from the peripheral edge portion 114f by changing the materials of the peripheral edge portion 114f and the center portion 114g of the sensor diaphragm 114 so that the material of the center portion has lower rigidity than the material of the peripheral edge portion.

Moreover, this rigidity is specified from the Young's modulus and the Poisson's ratio of the materials for the sensor diaphragm 114 and the glass plate 115. When the bending rigidity of the plate is defined as D, the plate thickness is defined as h, the elasticity constant (Young's modulus) is defined as E, and the Poisson's ratio is defined as v, the bending rigidity D of the plate can be expressed as $D=Eh^3/12(1-v^2)$. Consequently, it is possible to reduce the rigidity of the sensor diaphragm 114 towards the center portion 114g from the peripheral edge portion 114f through selecting the materials for the sensor diaphragm 114, which is disk shaped, and the materials for the glass plate 115.

Figure 9:
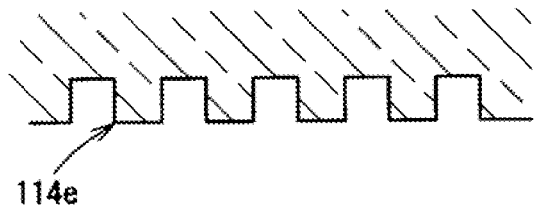
FIG. 9 is a partial magnified diagram of the bottom face in the pressure sensor chip according to the example.

Additionally, as illustrated in the partial enlargement in FIG. 9, on the face on the bottom side of the sensor diaphragm 114, that is, the face (bottom face) 114b of the pressure introduction chamber side that comes into contact with the medium to be measured (that is, the face it comes into contact with the medium to be measured), a fine corrugation 114e is formed across the entire surface, to the center portion from the peripheral edge portion that is the boundary of the recessed portion 17a of the sensor pedestal 17 and the inner peripheral surface of the hole 16a of the spacer 16. The corrugation 114e is formed through a well-known micromachining technology. This sensor diaphragm 114 is formed from sapphire, as described above, but there is no limitation thereto, and another material, such as silicon or a nickel alloy that is resistant to corrosion, may be used.

This sensor diaphragm 114 is held sandwiched between the sensor pedestal 17 of the capacitor chamber side and the spacer 16 of the pressure introduction chamber side, where the peripheral edge portion is bonded securely to the end faces 17b and 16b of the sensor pedestal 17 and the spacer 16. Additionally, in the sensor diaphragm 114, the rigidity of the center portion 114g is less than the rigidity of the peripheral edge portion 114f, on the inside, with the inner peripheral surface of the sensor pedestal 17 and the spacer 16 as the boundary.

Figure 10:
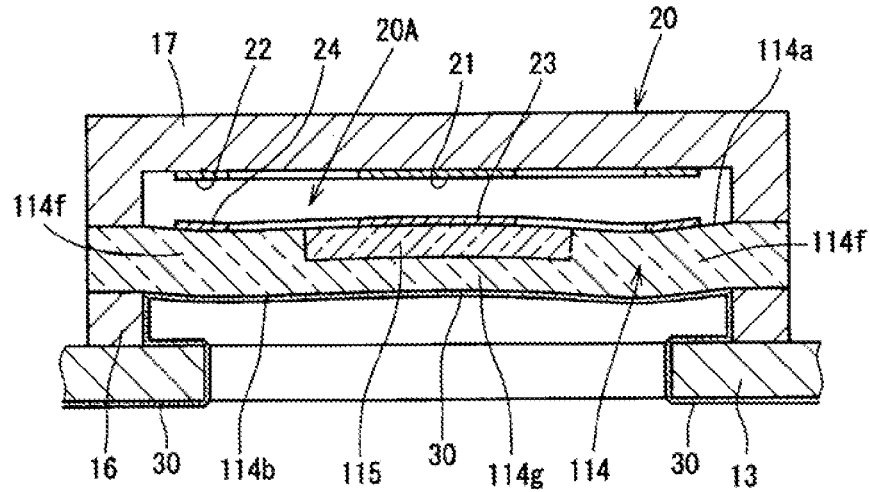
FIG. 10 is an explanatory diagram illustrating one example of a state wherein there is flexure due to a deposition component of the medium being measured being adhered to the sensor diaphragm according to the other example.

FIG. 10 illustrates the state wherein a deposition component 30 in the medium to be measured is adhered to and deposited on the face (the bottom face) 114b of the sensor diaphragm 114 that contacts the medium to be measured, so that the region of the peripheral edge portion 114f of the sensor diaphragm 114 (the region that is to the outside of the recessed portion 114c) is flexed slightly towards the pressure introduction chamber side (the face side that makes contact with the medium to be measured, which is downward in FIG. 10) (tension), and the region of the center portion 114g (the region of the recessed portion 114c) is flexed slightly towards the capacitor chamber side (the capacitor chamber 20A) (upward in FIG. 10) (compression).

Figure 11:
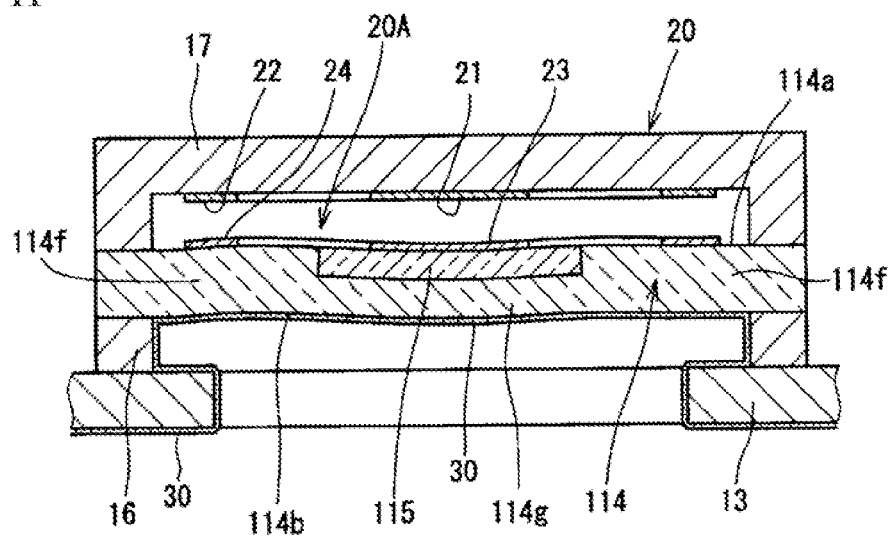
FIG. 11 is an explanatory diagram illustrating another example of a state wherein there is flexure due to a deposition component of the medium being measured being adhered to the sensor diaphragm.

Additionally, FIG. 11 illustrates the state wherein a deposition component 30 in the medium to be measured is adhered to and deposited on the face (the bottom face) 114b of the sensor diaphragm 114 that contacts the medium to be measured, so that the region of the peripheral edge portion 114f of the sensor diaphragm 114 (the region that is to the outside of the recessed portion 114c) is flexed slightly towards the capacitor chamber side (the capacitor chamber 20A side, which is upward in FIG. 11) (compression), and the region of the center portion 114g (the region of the recessed portion 114c) is flexed slightly towards the pressure introduction chamber side (the face side that makes contact with the medium to be measured, which is downward in FIG. 11) (tension).

As described above, it is impossible to cause the deposits, which will vary depending on the medium to be measured, and the materials of the sensor diaphragm 114 to always match each other, and, microscopically, the arrangements of the atoms in the deposited substances and in the sensor diaphragms rarely match perfectly, and thus the deposited substances normally produce the compression or elongation described above. Given this, the flexure of the pressure-sensitive diaphragm becomes larger the greater the amount of the deposited substance that is deposited on the pressure-sensitive diaphragm. Consequently, the flexure of the sensor diaphragm 114 will flex as illustrated in FIG. 10 and FIG. 11, in accordance with the type of materials of the sensor diaphragm 114 and of the glass plate 115, and with the type of the medium to be measured.

It is possible to suppress the zero point shift of the pressure sensor 10, because it is possible to reduce the change in the spacing between the opposing pressure sensing side stationary electrode 21 and pressure sensing side movable electrode 23 and the reference side stationary electrode 22 and the reference side movable electrode 24, through suppressing the flexure in the one direction of the sensor diaphragm 114 that is caused by the compression or tension of the deposition component 30 in the medium to be measured, even when the deposition component 30 in the medium to be measured adheres to and is deposited on the face 114b of the sensor diaphragm 114 that comes in contact with the medium to be measured.

Additionally, it is possible to suppress the flexure of the sensor diaphragm in the thickness direction arising from the internal stresses through essentially reducing the tensile forces or compressive forces, depending on the component, with which the internal stresses of the deposited substance act on the sensor diaphragm 114, because it is possible to separate the deposition component 30 into deposit pieces, in accordance with the cavity, when the deposition component 30 within the medium to be measured adheres to and is deposited on the sensor diaphragm, through the formation of the fine corrugation 114e on the face (the bottom face) 114b that contacts the medium to be measured. Doing so makes it possible to suppress the zero point shift of the pressure sensor 10 more effectively.

Note that while in the example set forth above a case was described wherein the rigidity was reduced toward the center portion from the peripheral edge portion with the center portion being a two-layer structure wherein a glass plate 115 was fitted and secured in a recessed portion 114c provided in the top face 114a of the sensor diaphragm 114, there is no limitation thereto, and a multi-level structure, being a structure of three or more layers, is also possible.

As explained above, having the center portion and the peripheral edge portion that is the boundary with the diaphragm securing portion of the capacitor chamber side be of different materials, and having the material of the center portion be a material with lower rigidity than the material of the peripheral edge portion, makes it possible to suppress the flexure to one side of the sensor diaphragm that results from the compression or tension in the deposited substance, even when a component in the medium being measured adheres to and is deposited onto the surface of the sensor diaphragm that is in contact with the medium being measured, thus making it possible to suppress the zero point shift of the pressure sensor.

Note that in the example set forth above, a recessed portion 114c was formed in the top face 114a of the sensor diaphragm 114, and a glass plate 115 was fitted and secured therein, where the pressure sensing side movable electrode 23 was formed on the top face of the glass plate 115. This is because the pressure measurement of a corrosive gas is envisioned in the present form of embodiment, and the material for the sensor diaphragm 114, which has one side (the bottom side in FIG. 8 in FIG. 10) as a face that comes into contact with the gas, is sapphire, with its superior resistance to corrosion. However, if the medium to be measured, which is subject to the pressure measurement, is not a corrosive gas, then the same effects of the present invention can be produced through forming a recessed portion in the bottom face 114b of the sensor diaphragm 114, which will come into contact with the medium to be measured, fitting and securing the glass plate 115 therein, and forming the pressure sensing side movable electrode 23 in a position corresponding to the glass plate 115 on the top face of the sensor diaphragm 114. Moreover, even when the recessed portion is formed in the bottom face 114b of the sensor diaphragm 114 in this way and a material is fitted and secured therein, it is possible to exhibit the effects of the present example by using a plate of a material that is resistant to corrosion instead of the glass plate 115.

Moreover, it is possible to apply the present example even with the sensor diaphragm 114 being concave and the sensor pedestal 17 being formed in a plate shape, with the space that is partitioned by the sensor diaphragm and the sensor pedestal being the capacitor chamber.

Furthermore, even if the spacer 16 is of a different material from that of the sensor diaphragm 114, or even if it is integrated with the sensor diaphragm, the effects of the present invention can still be produced. Note that in this case, the diaphragm may be formed as a monolithic component through etching.

What is claimed is:

1. An electrostatic capacitive pressure sensor comprising a pressure sensor chip for detecting an electrostatic capacitance in accordance with the pressure of a medium being measured, wherein:
   one face of a sensor diaphragm of the pressure sensor is a pressure introduction chamber side for introducing the medium to be measured, and the other face is a capacitor chamber side for forming a capacitor portion; and
   the sensor diaphragm is of less rigidity toward the center portion from the peripheral edge portion that is a boundary with a diaphragm securing portion of the capacitor chamber side and the peripheral edge portion or the center portion of the sensor diaphragm flexes to the pressure introduction chamber side, and the other flexes to the capacitor chamber side, in accordance with a deposition of a component of a medium to be measured onto a surface of the sensor diaphragm that contacts the medium to be measured.

2. The electrostatic capacitive pressure sensor as set forth in claim 1, wherein:
   in the sensor diaphragm, the thickness is thinner towards the center portion from a peripheral edge portion that is a boundary with a diaphragm securing portion on the capacitor chamber side.

3. The electrostatic capacitive pressure sensor as set forth in claim 2, wherein:
   in the sensor diaphragm, the thickness is continuously thinner towards the center portion from a peripheral edge portion that is a boundary with a diaphragm securing portion on the capacitor chamber side.

4. The electrostatic capacitive pressure sensor as set forth in claim 2, wherein:
   in the sensor diaphragm, the thickness is stepwise thinner towards the center portion from a peripheral edge portion that is a boundary with a diaphragm securing portion on the capacitor chamber side.

5. The electrostatic capacitive pressure sensor as set forth in claim 2, wherein:
   the sensor diaphragm has a specific cavity in the pressure introduction chamber when viewed from the direction in which the medium to be measured is introduced.

6. The electrostatic capacitive pressure sensor as set forth in claim 5, wherein:
   the sensor diaphragm has a cavity of a specific depth that is continuous to the center portion from a peripheral edge portion that is a boundary with a diaphragm securing portion on the capacitor chamber side; and the width of the cavity increases stepwise towards the center portion from the peripheral edge portion.

7. The electrostatic capacitive pressure sensor as set forth in claim 1, wherein:
the peripheral edge portion of the sensor diaphragm that is the boundary with the diaphragm securing portion on the capacitor chamber side and the center portion of the sensor diaphragm are made from different materials; and
the material of the center portion is material with lower rigidity than the material of the peripheral edge portion.

8. The electrostatic capacitive pressure sensor as set forth in claim 1, wherein:
the peripheral edge portion of the sensor diaphragm that is the boundary with the diaphragm securing portion of the capacitor chamber side is structured from a single material and the center portion of the sensor diaphragm has a two-layer structure made from different materials, where the pressure introduction chamber side of the sensor diaphragm is made from the same material as the peripheral edge portion, and the capacitor chamber side of the sensor diaphragm is made from a material of lower rigidity than the material of the peripheral edge portion.

9. The electrostatic capacitive pressure sensor as set forth in claim 7, wherein:
the rigidity is determined by the Young's modulus and the Poisson's ratio of the material.

10. The electrostatic capacitive pressure sensor as set forth in claim 7, wherein:
the material of the peripheral edge of the sensor diaphragm is sapphire, and the material of the center portion is quartz glass.

11. The electrostatic capacitive pressure sensor as set forth in claim 7, wherein:
the sensor diaphragm has a specific cavity in the pressure introduction chamber when viewed from the direction in which the medium to be measured is introduced.

* * * * *